United States Patent [19]
Han

[11] Patent Number: 6,133,955
[45] Date of Patent: Oct. 17, 2000

[54] METHOD FOR ENCODING A BINARY SHAPE SIGNAL

[75] Inventor: Seok-Won Han, Seoul, Rep. of Korea

[73] Assignee: Daewoo Electronics Co. Ltd., Rep. of Korea

[21] Appl. No.: 08/940,394

[22] Filed: Oct. 1, 1997

[30] Foreign Application Priority Data

Aug. 30, 1997 [KR] Rep. of Korea ..................... 97-44087

[51] Int. Cl.⁷ ...................................................... H04N 7/36
[52] U.S. Cl. ........................................... 348/416; 382/238
[58] Field of Search .................................. 348/391, 413, 348/416; 382/238; H04N 7/36

[56] References Cited

U.S. PATENT DOCUMENTS

| 5,929,915 | 7/1999 | Cho | 348/416 |
| 5,933,105 | 8/1999 | Cho | 348/416 |

*Primary Examiner*—Howard Britton
*Attorney, Agent, or Firm*—Anderson Kill & Olick

[57] ABSTRACT

In a method for encoding a binary alpha block (BAB) within a current frame based on the current frame and a previous frame, even-numbered horizontal lines of the BAB are sampled to generate a first block and even-numbered vertical lines of the first block are sampled to generate a first sample block. And then, a reconstructed first block and a reconstructed BAB are generated by inserting reconstructed vertical and horizontal lines sequentially at locations of odd-numbered vertical and horizontal lines thereof, respectively. In the above, binary values of first and second binary pixels of the reconstructed vertical and horizontal lines are made by using corresponding first and second context values based on predetermined probability tables, respectively, wherein the corresponding first and second context values are calculated by using the context values of binary pixels within the previous frame located at identical positions to the first and second binary pixels, respectively; and context values of binary pixels located at surrounding positions of the first and the second binary pixels except a binary pixel below the first binary pixel and a binary pixel right to the second binary pixel, respectively.

11 Claims, 3 Drawing Sheets

|  | C9 | C8 | C7 |  |
|---|---|---|---|---|
| C6 | C5 | C4 | C3 | C2 |
| C1 | C0 | X |  |  |

| C'3 | C'2 | C'1 |
|---|---|---|
| C'0 | Y |  |

|  | C'8 |  |
|---|---|---|
| C'7 | C'6 | C'5 |
|  | C'4 |  |

| V0 | V3 | V5 |
|----|----|----|
| ////|////|////|
| V1 | A  | V6 |
|////|////|////|
| V2 |    | V7 |

|    |    |    |
|----|----|----|
|////|////|////|
|    | V4 |    |
|////|////|////|
|    |    |    |

| V'0 | V'1 | V'2 |
|-----|-----|-----|
| V'3 | B   |     |
| V'5 | V'6 | V'7 |

|  |      |  |
|--|------|--|
|  | V'4  |  |
|  |      |  |

METHOD FOR ENCODING A BINARY SHAPE SIGNAL

FIELD OF THE INVENTION

The present invention relates to a method for encoding a binary shape signal; and, more particularly, to a method for encoding a binary shape signal employing a context-based encoding technique.

DESCRIPTION OF THE PRIOR ART

In digital video systems such as video-telephone and teleconference systems, a large amount of digital data is needed to define each video frame signal since the video frame signal comprises a sequence of digital data referred to as pixel values.

Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects; and three sets of parameters for defining the motion, contour and pixel data of each object are processed through different encoding channels.

One example of such object-oriented coding scheme is the so-called MPEG (Moving Picture Experts Group) phase 4 (MPEG4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can access and manipulate. A VOP can be referred to as an object and represented by a bounding rectangle whose width and height may be the smallest multiples of 16 pixels (a macroblock size) surrounding each object so that the encoder may process the input video image on a VOP-by-VOP basis, i.e., an object-by-object basis.

A VOP described in MPEG-4 includes shape information and color information consisting of luminance and chrominance data, wherein the shape information is represented by, e.g., a binary mask and related to the luminance data. In the binary mask, one binary value, e.g., 0, is used to designate a pixel, i.e., a background pixel located outside the object in the VOP and the other binary value, e.g., 1, is used to indicate a pixel, i.e., an object pixel inside the object.

A binary shape signal, representing the location and shape of the objects, can be expressed as a binary alpha block (BAB) within a frame or a VOP, e.g., a block of 16×16 binary pixels, wherein each binary pixel has a binary value, e.g., 0 or 1 representing either an object pixel or a background pixel.

A BAB can be encoded by using a conventional bit-map-based shape coding method such as a context-based arithmetic encoding (CAE) method (see *MPEG-4Video Verification Model Version* 2.0, International Organization for Standardization, ISO/IEC JTC1/SC29/WG11 N1260, March 1996).

For instance, in an intra mode, a BAB is encoded by using a conventional CAE method to thereby generate an encoded BAB. And in an inter mode, a motion vector representing the displacement between a BAB within a current frame (or VOP) and its most similar BAB within a previous frame (or VOP) together with error data representing the difference therebetween are found by motion estimation and compensation. The error data is encoded by using a conventional CAE to thereby generate an encoded error data. And then, the encoded error data and the motion vector is combined to thereby generate an encoded BAB.

However, the encoded BAB obtained such as above is decoded at a decoder into a reconstructed image which has only a preset resolution. Therefore, if an image for a BAB with a higher resolution is desired, the BAB is conventionally coded with scalability implemented therein which gradually increases resolution of the decoded image for the BAB. That is, a base layer representing an image for a BAB with a lower resolution is coded; and based on the base layer, additional information is added to generate an enhancement layer for the BAB, which is, then, coded.

The encoded data, i.e., the encoded BAB implemented with scalability such as above is transmitted to a decoder to be decoded therein. There are various ways to decode such data at the decoder. One way is that only the coded lower layer, for example, the coded base layer, is decoded to acquire an image with a lower resolution. However, to enhance the resolution of the image, the base layer and a few of its upper layers can be decoded. To enhance the resolution still further, all the layers transmitted can be decoded, achieving an image with a same resolution as the original image, assuming that a lower layer is decoded prior to its higher layers even though the higher layers may not be decoded.

The encoding and the decoding methods implemented with scalability, such as described herein, can not only reduce error, but also prevent loss of bits, thereby achieving a transmission of images with excessively high resolutions. And, it is well-known in the art that an effective CAE method is important whether the base layer or the enhancement layer is encoded.

Figure 1A:
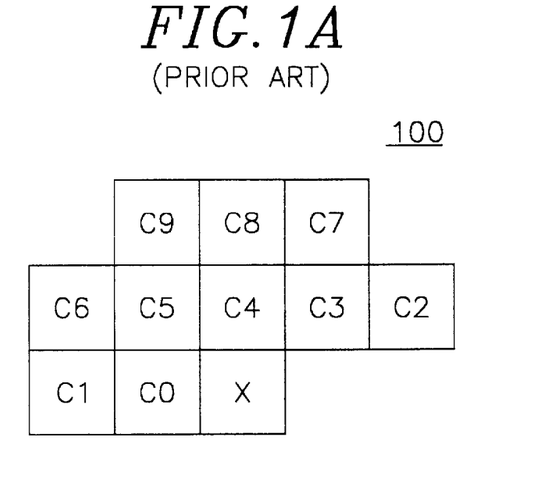
FIGS. 1A to 1C illustrate sets of binary pixels marked with their context values to describe a conventional context-based arithmetic encoding (CAE) method.
Figure 1B:
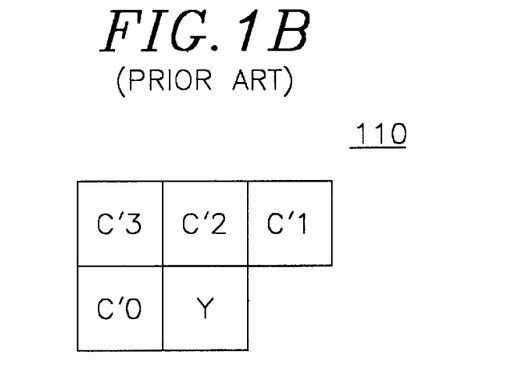
Figure 1C:
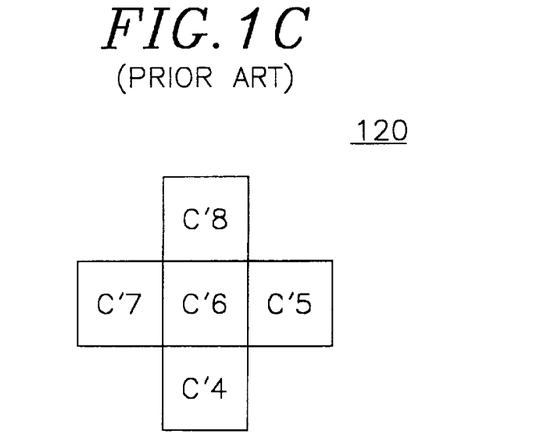

Referring to FIGS. 1A to 1C, there are shown sets of binary pixels having context values thereof to explain the conventional CAE method. In the following, one aspect of the conventional CAE method is described with reference to FIGS. 1A to 1C.

The CAE method is a technique to encode BAB's within a frame or a VOP. Each of the BAB's is a block of M×N binary pixels, e.g., a block of 16×16 binary pixels, wherein M and N are positive even integers, respectively. The sequence of encoding for the BAB's within a VOP or a frame usually depends on a so-called raster scanning order.

The CAE method, firstly, calculates the context value for each binary pixel within a BAB to be encoded. The context value for a binary pixel within a BAB represents an index indicating the location of a probability value for the binary pixel on a predetermined probability table having probability values stored therein in a preset order. Therefore, by referring to the probability value indicated by the context value for the binary pixel, it can be identified whether the binary pixel is a background pixel, having a binary value of, e.g., 0, or an object pixel, having a binary value of, e.g., 1.

Thereafter, all of the context values for all of the binary pixels within the BAB are encoded to thereby generate an encoded BAB including encoded context values therein to be transmitted to a decoder via a transmitter.

The decoder decodes the encoded context values to thereby obtain reconstructed context values. Based on each of the reconstructed context values, the probability value for the corresponding binary pixel is found at the decoder from the probability table identical to the one used in the encoding process described above to thereby reconstruct each binary pixel with value such as 1 or 0, thereby producing a reconstructed BAB for the BAB.

It has been well known in the art that the context values of binary pixels surrounding each binary pixel can be employed in calculating the context value of the binary pixel, thereby changing the efficiency of CAE encoding the BAB. A method for calculating a context value for a binary pixel, used in the conventional CAE encoding method, which employs the context values of binary pixels surrounding the binary pixel is described in more detail in the following with reference to FIGS. 1A to 1C.

In FIG. 1A, there is illustrated a set of binary pixels 100 within a BAB or an original BAB, including binary pixels having context values C0 to C9 and a binary pixel located at the position X, which will be called a binary pixel X in the following. The set of binary pixels 100 will be used to calculate a context value of the binary pixel X. In case of a intra mode, the context value of the binary pixel X, referred to as C, is calculated by using the ten context values C0 to C9 according to Eq. (1) shown below;

$$C = \sum_{k=0}^{9} (C_k)2^k. \quad \text{Eq. (1)}$$

In the Eq. (1), $C_k$ represents the binary value, either 1 or 0, of the binary pixel having the context value of Ck.

In FIG. 1B, there is illustrated a set of binary pixels 110 within a BAB in a current frame (or VOP), wherein the set of binary pixels 110 includes binary pixels having context values C'0 to C'3 and a binary pixel located at the position Y, cited as a binary pixel Y in the following. In case of an inter mode, in the current frame, the context values C'0 to C'3 of binary pixels in the set of binary pixels 110 are used to calculate C', the context value of the binary pixel Y.

In FIG. 1C, a set of binary pixels 120 within a BAB included in a most similar previous frame (or VOP) of the current frame (or VOP) is illustrated, wherein, in case of the inter mode, context values C'4 to C'8 are the context values being considered in the previous frame (or VOP) to calculate the context value C'. It is assumed that the binary pixel within the BAB in the previous frame having the context value of C'6, in FIG. 1C, corresponds, or matches, to the binary pixel Y in FIG. 1B.

Referring to FIGS. 1B and 1C, the context value C' is calculated by using the context values C'0 to C'8 as in Eq. (2), wherein $C'_k$ represents the binary value, either 1 or 0, of the binary pixel having the context value of C'k;

$$C' = \sum_{k=0}^{8} (C'_k)2^k. \quad \text{Eq. (2)}$$

And then, the probability value for each binary pixel within the BAB, based on the context value thereof calculated such as above, is found by using a predetermined probability table to thereby produce a reconstructed BAB for each BAB consisting of binary values such as 1 or 0. The reconstructed BAB is, then, compared with the original BAB to provide an error data block consisting of pixels of first and second binary values, e.g., 1 and 0, respectively. In this case, the first binary value represents that the value of a binary pixel in the BAB is not identical to that of a corresponding binary pixel located at the same position of the binary pixel in the reconstructed BAB.

Subsequently, the error data block is encoded by using a conventional encoding method, for example, a reference contour based (RCB) coding method to thereby couple encoded error data block to the decoder via the transmitter.

In addition to this, to enhance the efficiency of coding in the conventional CAE method, a plurality of mode signals are encoded to be transmitted on a BAB-by-BAB basis instead of transmitting all the encoded context values for binary pixels of the BAB's. For instance, according to a conventional mode coding method, an inter/intra mode signal denoting whether the encoder is in the inter or the intra mode, a mode signal indicating all the pixels within the BAB are either background or object pixels and a mode signal signifying that a motion vector in the inter mode is zero, can be encoded to be transmitted. The decoder generates a reconstructed BAB as close to the original BAB as possible based on the encoded context values, the encoded error data block, and the encoded mode signals such as above.

However, in the conventional CAE method such as above, since there exist considerable amount of error data representing the difference between the reconstructed and the original BAB's, it was inevitable to allocate considerable amount of data bits in order to encode and then transmit the BAB. And the conventional mode coding method described above has limitation in increasing the coding efficiency for the BAB.

SUMMARY OF THE INVENTION

It is, therefore, a primary object of the invention to provide a context-based method for encoding a binary shape signal, which can further increase the efficiency of coding.

In accordance with the present invention, there is provided a method for encoding a binary alpha block (BAB) of M×N binary pixels within a current frame based on the current frame and a previous frame including a multiplicity of BAB's, M and N being positive even integers, respectively, wherein each binary pixel has a binary value representing either an object pixel or a background pixel, comprising the steps of: (a) sampling every other horizontal lines of the BAB to generate a first block of (M/2)×N binary pixels starting from either a first or a second horizontal line of the BAB, wherein the first horizontal line is a topmost horizontal line of the BAB; (b) sampling every other vertical lines of the first block to generate a first sample block of (M/2)×(N/2) binary pixels as a base layer starting from either a first or a second vertical line of the first block, wherein the first vertical line is a leftmost vertical line of the first block; (c) generating a reconstructed first block of (M/2)×N binary pixels by inserting (N/2) number of reconstructed vertical lines sequentially at locations of vertical lines not sampled in the step (b) under the condition that (N/2) number of vertical lines of the first sample block are placed at locations of the vertical lines sampled in the step (b), the reconstructed vertical lines being produced based on vertical lines of the first sample block and each binary pixel of the reconstructed vertical lines referred to as a first target pixel being made by using a corresponding first context value based on a predetermined probability table, wherein the corresponding first context value for the first target pixel is calculated by using the context values of 8 binary pixels including a binary pixel located at an identical position to that of the first target pixel within the previous frame and 7 binary pixels located at a upper left, left, lower left, above, upper right, right and lower right positions, respectively, of the first target pixel within the reconstructed first block; and (d) producing a reconstructed BAB, being referred to as a first reconstructed BAB, of M×N binary pixels by inserting (M/2) number of reconstructed horizontal lines sequentially at locations of horizontal lines not sampled in the step (a) under the condition that (M/2) number of horizontal lines of the reconstructed first block are placed at locations of the horizontal lines sampled in the step (a), the reconstructed horizontal lines being produced based on the horizontal lines of the reconstructed first block and each binary pixel referred to as a second target pixel being made by using a corresponding second context value based on a predetermined probability table, wherein the corresponding second context value for the second target pixel is calculated by using the context values of 8 binary pixels including a binary pixel located at an identical position to that of the second target pixel within the previous frame and 7 binary pixels located at an upper left, above, upper right, left, lower left, below, lower right positions, respectively, of the second target pixel within the reconstructed BAB.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In accordance with the present invention, a method for encoding a binary shape signal employing a context-based arithmetic encoding (CAE) method is provided. In FIGS. 2A to 2D, sets of binary pixels marked with their context values are shown, which will be used in describing a CAE method in accordance with a preferred embodiment of the present invention.

In the following, referring to FIGS. 2A to 2D, the CAE method for encoding a binary alpha block (BAB) or an original BAB of M×N binary pixels, e.g., 16×16 binary pixels, within a current frame or a video object plane (VOP) based on the current and a previous frame including a multiplicity of BAB's will be described, wherein each binary pixel has a binary value representing either an object pixel or a background pixel, M and N being positive even integers, respectively.

To encode the BAB of M×N binary pixels, the BAB is first sampled or sub-sampled. Namely, in a horizontal sampling process for the BAB, every other horizontal lines of the BAB are sampled to generate a first block of (M/2)×N binary pixels starting from either a first or a second horizontal line of the BAB, wherein the first horizontal line is a topmost horizontal line of the BAB. And then, in a vertical sampling process for the first block, every other vertical lines of the first block are sampled to generate a first sample block of (M/2)×(N/2) binary pixels as a base layer starting from a first or a second vertical line of the first block, wherein the first vertical line is a leftmost vertical line of the first block. The base layer is encoded by using a conventional CAE method to thereby provide an encoded base layer.

In detail, in case of an intra mode, the first sample block, i.e., the base layer, is encoded by using a conventional bit-map-based encoding method, for example, a CAE method, to thereby supply the encoded base layer. And, in case of an inter mode, first sample blocks are obtained in the same manner generating the first sample blocks within the current frame described above based on corresponding BAB's within the previous frame and then the first sample blocks within the previous frame are stored. Thereafter, a first sample block within the previous frame which is most similar to the first sample block in the current frame is detected as a predicted first sample block by comparing the first sample block within the current frame with the first sample blocks within the previous frame.

Then, a motion vector, expressed by a two-dimensional vector having a horizontal and a vertical components, is obtained, wherein the motion vector represents a displacement between the first sample block within the current frame and the predicted first sample block within the previous frame. And the motion vector is encoded to thereby generate an encoded motion vector. Error data representing the difference between the first sample block within the current frame and the predicted first sample block is encoded, thereby producing encoded error data. And then, the encoded motion vector and the encoded error data are combined to thereby supply the encoded base layer.

In addition to this, a reconstructed first sample block within the current frame is obtained based on the encoded error data and the predicted first sample block, wherein the reconstructed first sample block within the current frame is stored and then used in a motion estimation process for a first sample block in the following frame.

Hereinafter, an enhancement layer encoding process for the BAB will be described. First, in the intra mode, a reconstructed BAB is obtained by using a conventional reconstruction method, for example, a scan interleaving (SI) technique employing a conventional CAE method. Namely, a reconstructed first block of (M/2)×N binary pixels is produced by using, e.g., a SI technique employing a conventional CAE method. In detail, the reconstructed first block is produced by inserting (N/2) number of reconstructed vertical lines sequentially at locations of vertical lines not sampled in the vertical sampling process for the first block under the condition that (N/2) number of vertical lines of the first sample block are placed at locations of the vertical lines sampled in the vertical sampling process, wherein the reconstructed vertical lines are produced based on vertical lines of the first sample block and each binary pixel of the reconstructed vertical lines is obtained by using a context value corresponding thereto generated by using a conventional CAE method.

And then, a reconstructed BAB of M×N binary pixels is produced by inserting (M/2) number of reconstructed horizontal lines sequentially at locations of horizontal lines not sampled in the horizontal sampling process for the BAB under the condition that (M/2) number of horizontal lines of the reconstructed first block are placed at locations of the horizontal lines sampled in the horizontal sampling process, wherein reconstructed horizontal lines are produced based on horizontal lines of the reconstructed first block and each binary pixel of the reconstructed horizontal lines is obtained by using a context value corresponding thereto generated by using a conventional CAE method.

Meanwhile, in case of the inter mode, a reconstructed BAB is obtained by using a reconstruction method in accordance with a preferred embodiment of the present invention. In detail, a reconstructed first block is generated by inserting (N/2) number of reconstructed vertical lines sequentially at locations of vertical lines not sampled in the vertical sampling process for the first block under the condition that (N/2) number of vertical lines of the first sample block are placed at locations of the vertical lines sampled in the vertical sampling process, wherein the reconstructed vertical lines are produced based on the vertical lines of the first sample block and each binary pixel of the reconstructed vertical lines is obtained by using a context value corresponding thereto generated by using a CAE method in accordance with the present invention.

And then, a reconstructed BAB of M×N binary pixels is produced by inserting (M/2) number of reconstructed horizontal lines sequentially at locations of horizontal lines not sampled in the horizontal sampling process for the BAB under the condition that (M/2) number of horizontal lines of the reconstructed first block are placed at locations of the horizontal lines sampled in the horizontal sampling process, wherein the reconstructed horizontal lines are produced based on the horizontal lines of the reconstructed first block and each binary pixel of the reconstructed horizontal lines is generated by using a context value corresponding thereto made by using the CAE method in accordance with the present invention.

The CAE method in accordance with a preferred embodiment of the present invention will be described hereinafter in detail. From now on, each binary pixel of the reconstructed vertical lines will be referred to as a first target pixel, and, similarly, each binary pixel of the reconstructed horizontal lines as a second target pixel. And, for simplicity, it is assumed that both the horizontal and the vertical lines sampled in the above are even-numbered lines in the following.

Figure 2A:
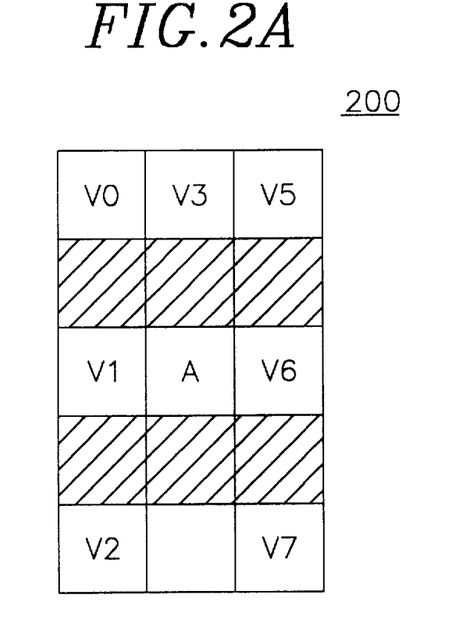
FIGS. 2A to 2D show sets of binary pixels marked with their context values to explain a context-based arithmetic encoding (CAE) method according to the present invention.
Figure 2B:
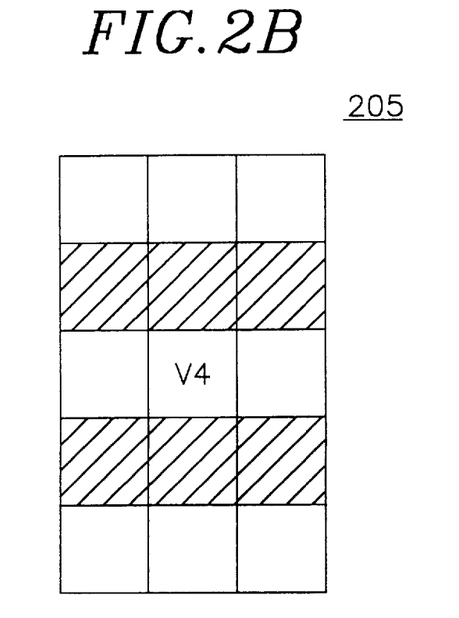

Referring to FIGS. 2A and 2B, there are illustrated sets of binary pixels 200 and 205, wherein un-hatched regions in the sets of binary pixels 200 and 205 represent sets of binary pixels of reconstructed first blocks within the current frame and a previous frame, respectively; a hatched region in the set of binary pixel 200 represents a set of binary pixels which will be reconstructed as pixels of reconstructed horizontal lines and a hatched region in the set of binary pixel 205 represents a set of binary pixels which have been reconstructed as pixels of reconstructed horizontal lines within the previous frame.

In FIG. 2A, there are illustrated a first target pixel A, V0 to V3 and V5 to V7 representing the context values of the binary pixels located at upper left, left, lower left, above and upper right, right, lower right positions, respectively, of the first target pixel A within the reconstructed first block as shown thereon. These context values are known beforehand. But, the context value of the binary pixel below the first target pixel A is not known and thus is left empty.

The context value of the first target pixel A, referred to as a first context value V from hereon, is calculated by using the context values V0 to V3, and V5 to V7, and a context value of a binary pixel located at an identical position to that of the first target pixel A in the previous frame (or VOP), which is referred to as V4 as illustrated in FIG. 2B, according to Eq. (3) shown below;

$$V = \sum_{k=0}^{7}(V_k)2^k. \qquad \text{Eq. (3)}$$

In Eq. (3), $V_k$ represents a binary value, either 1 or 0, of the binary pixel having the context value of Vk. When there is no binary pixel having the context value of Vk, $V_K$ is set as 0. The first context value V, calculated according to Eq. (3), can have a value ranging from 0 to 255. In this way, context values of all the binary pixels on the reconstructed vertical lines whose binary values are not known are calculated. Then, looking up calculated context values in a predetermined probability table, the reconstructed first block is produced.

In the above preferred embodiment of the present invention, k, representing the order of the context value Vk among the eight context values used in calculating the first context value of the first target pixel A, has followed an order such that a left vertical line and an upper horizontal line come first. This can be altered to, for example, a so-called a raster scanning order, in which case the predetermined probability table changes accordingly.

Figure 2C:
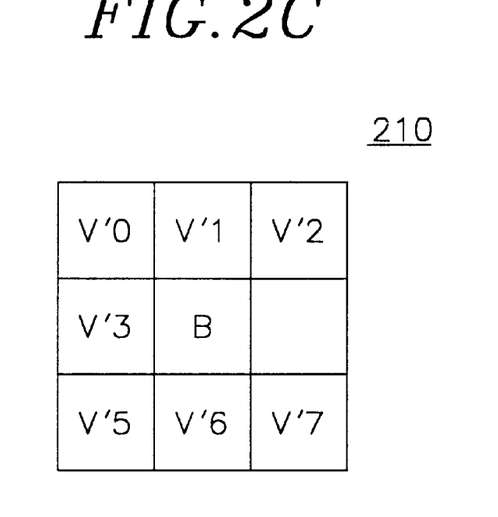
Figure 2D:
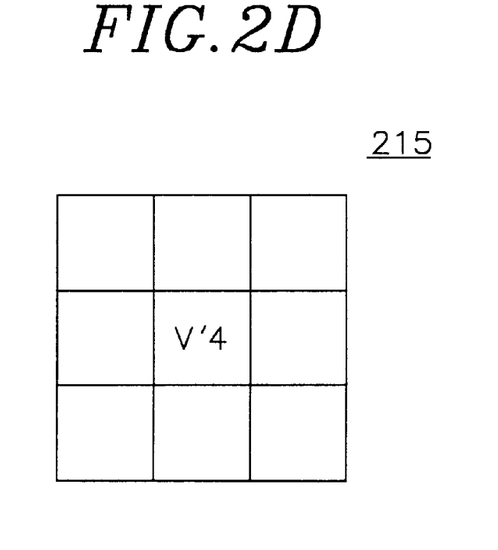

Referring to FIGS. 2C and 2D, there are illustrated sets of binary pixels 210 and 215 in reconstructed BAB's within the current and the previous frames, respectively. In FIG. 2C, there are illustrated a second target pixel B, V'0 to V'3 and V'5 to V'7 representing the context values of the binary pixels located at upper left, above, upper right, left and lower left, below, lower right positions, respectively, of the second target pixel B as shown thereon. These context values are known beforehand. But, the context value of the binary pixel right to the second target pixel B is not known and thus is left empty.

The context value of the second target pixel B, referred to as a second context value V' from hereon, is calculated by using the context values V'0 to V'3, and V'5 to V'7, and a context value of a binary pixel located at an identical position to that of the second target pixel B within the previous frame (or VOP), which is referred to as V'4 as illustrated in FIG. 2D, according to Eq. (4) shown below;

$$V' = \sum_{k=0}^{7}(V'_k)2^k. \qquad \text{Eq. (4)}$$

In Eq. (4), $V'_k$ represents a binary value, either 1 or 0, of the binary pixel having the context value of V'k. When there is no binary pixel having the context value of V'k, $V'_k$ is set as 0. The second context value of V', calculated according to Eq. (4), can have a value ranging from 0 to 255. In this way, context values of all the binary pixels on the reconstructed horizontal lines whose binary values are not known are calculated. Then, looking up calculated context values in a predetermined probability table, the reconstructed BAB is produced.

In the above preferred embodiment of the present invention, k, representing the order of the context value V'k among the eight context values used in calculating the second context value of the second binary pixel B, has followed a raster scanning order. This can be altered to, for example, an order representing that a upper horizontal line and a left vertical line come first. In which case the predetermined probability table changes accordingly. Hence, it should be noticed here that recorded orders of context values on predetermined probability table can be changed under the condition that the predetermined probability table has been prepared in accordance with the orders.

In the inter mode, the reconstructed BAB obtained according to the CAE method in accordance with the present invention, which can be referred to as a type of an interpolation method, can reduce error between the reconstructed BAB and the original BAB in comparison with a conventional method. The reconstructed BAB obtained by using an interpolation method in accordance with the present invention will be called as a first reconstructed BAB from now on.

Nevertheless, in some cases in the inter mode, a CAE method of the present invention by using an insertion method instead of such an interpolation method may further reduce the error between the reconstructed and the original BAB's. Consequently, in accordance with a preferred embodiment of the present invention, a more advantageous one of the insertion and the interpolation methods is chosen to increase the coding efficiency.

For example, in the inter mode, a reconstructed BAB of M×N binary pixels can be obtained by using an insertion method as described in the following. In detail, first of all, each of first sample blocks of (M/2)×(N/2) binary pixels within the previous frame (or VOP) is subtracted from each of corresponding first blocks of (M/2)×N binary pixels within the previous frame (or VOP) to generate and store second sample blocks of (M/2)×(N/2) binary pixels within the previous frame (or VOP). And each of the corresponding first blocks within the previous frame (or VOP) is subtracted from each of corresponding BAB's within the previous frame (or VOP) to produce and store second blocks of (M/2)×N binary pixels within the previous frame (or VOP).

And a second sample block of (M/2)×(N/2) binary pixels within the current frame (or VOP) is obtained by subtracting the first sample block of (M/2)×(N/2) binary pixels from the first block of (M/2)×N binary pixels obtained based on a BAB or an original BAB within the current frame (or VOP). Then, based on the motion vector, among second sample blocks within the previous frame, a second sample block most similar to the second sample block within the current frame is detected as a predicted second sample block.

And a reconstructed first block within the current frame is created by placing or inserting vertical lines of the predicted second sample block as odd-numbered vertical lines thereof sequentially under the condition that vertical lines of the first sample block within the current frame are placed as even-numbered vertical lines thereof. As a result, the reconstructed first block of (M/2)×N binary pixels within the current frame is rendered by the insertion method.

Thereafter, in the inter mode, a second block of (M/2)×N binary pixels within the current frame (or VOP) is obtained by subtracting the first block of (M/2)×N binary pixels from the BAB of M×N binary pixels and then the second block is stored. Then, based on the motion vector, among second blocks within the previous frame, a second block most similar to the second block within the current frame is detected as a predicted second block. A reconstructed BAB of M×N binary pixels is created by placing or inserting horizontal lines of the predicted second block as odd-numbered horizontal lines thereof sequentially under the condition that horizontal lines of the BAB within the current frame are placed as evennumbered horizontal lines thereof. As a result, the reconstructed BAB of M×N binary pixels is rendered by the insertion method, which will be called as a second reconstructed BAB.

In accordance with the preferred embodiment of the invention, the first and the second reconstructed BAB's are encoded to thereby generate encoded first and second reconstructed BAB's, respectively, and then first and second numbers of data bits for the encoded first and second reconstructed BAB's, respectively, are calculated. And then, the first number of data bits is compared with the second numbers of data bits If the first number of data bits is equal to or less than the second number of data bits, the first reconstructed BAB and the encoded first reconstructed BAB are selected as a selected reconstructed BAB and a selected encoded reconstructed BAB, respectively. If otherwise, i.e., the first number of data bits is greater than the second number of data bits, the second reconstructed BAB and the encoded second reconstructed BAB are selected as a selected reconstructed BAB and a selected encoded reconstructed BAB, respectively.

Then, error data block representing the difference between the BAB, i.e., the original BAB within the current frame and the selected reconstructed BAB is encoded, thereby producing an encoded error data block by using a conventional error data block encoding method, e.g., a reference contour-based encoding (RCB) method.

Meanwhile, in the inter mode, mode signals are generated in relation to encoding of the first and the second reconstructed BAB's and the error data block, wherein the mode signals represent four modes described below. Namely, each of the four mode signals is a mode signal representing one of the four modes comprising:

(1) a first mode showing that the first reconstructed BAB is selected as the selected reconstructed BAB; there exists no error between the selected reconstructed BAB and the original BAB, thereby making encoding of the selected reconstructed BAB unnecessary; and, therefore, the selected reconstructed BAB has not been encoded;

(2) a second mode representing that the first reconstructed BAB is selected as the selected reconstructed BAB; and there exists some errors between the selected reconstructed BAB and the original BAB, thereby making encoding of the selected reconstructed BAB necessary; and, accordingly, the selected reconstructed BAB has been encoded;

(3) a third mode indicating that the second reconstructed BAB is selected as the selected reconstructed BAB; there exists no error between the selected reconstructed BAB and the original BAB, thereby making encoding of the selected reconstructed BAB unnecessary; and, consequently, the selected reconstructed BAB has not been encoded;

(4) a fourth mode indicating that the second reconstructed BAB is selected as the selected reconstructed BAB; and there exists some errors between the selected reconstructed BAB and the original BAB thereby, making encoding of the reconstructed BAB necessary; and, hence, the selected reconstructed BAB has been encoded.

And then, the mode signals are encoded to thereby generate encoded mode signals. And then, an encoded mode signal related one of the four modes described above, the selected encoded reconstructed BAB, and the encoded error data block are formatted to thereby provide encoded enhancement layer.

According to the present invention, enhancement layer coding efficiency can be enhanced by employing the improved context values in a CAE method and by appropriately combining the mode signals in encoding a binary shape signal, e.g., a BAB.

While the present invention has been described with respect to certain preferred embodiments only, other modifications and variations may be made without departing from the spirit and scope of the present invention as set forth in the following claims.

What is claimed is:

1. A method for encoding a binary alpha block (BAB) of M×N binary pixels within a current frame based on the current frame and a previous frame including a multiplicity of BAB's, M and N being positive even integers, respectively, wherein each binary pixel has a binary value representing either an object pixel or a background pixel, comprising the steps of:

(a) sampling every other horizontal lines of the BAB to generate a first block of (M/2)×N binary pixels starting from either a first or a second horizontal line of the BAB, wherein the first horizontal line is a topmost horizontal line of the BAB;

(b) sampling every other vertical lines of the first block to generate a first sample block of (M/2)×(N/2) binary pixels as a base layer starting from either a first or a second vertical line of the first block, wherein the first vertical line is a leftmost vertical line of the first block;

(c) generating a reconstructed first block of (M/2)×N binary pixels by inserting (N/2) number of reconstructed vertical lines sequentially at locations of vertical lines not sampled in the step (b) under the condition that (N/2) number of vertical lines of the first sample block are placed at locations of the vertical lines sampled in the step (b), the reconstructed vertical lines being produced based on the vertical lines of the first sample block and each binary pixel of the reconstructed vertical lines referred to as a first target pixel being made by using a corresponding first context value based on a predetermined probability table, wherein the corresponding first context value for the first target pixel is calculated by using the context values of 8 binary pixels including a binary pixel located at an identical position to that of the first target pixel within the previous frame and 7 binary pixels located at a upper left, left, lower left, above, upper right, right and lower right positions, respectively, of the first target pixel within the reconstructed first block; and (d) producing a reconstructed BAB, being referred to as a first reconstructed BAB, of M×N binary pixels by inserting (M/2) number of reconstructed horizontal lines sequentially at locations of horizontal lines not sampled in the step (a) under the condition that (M/2) number of horizontal lines of the reconstructed first block are placed at locations of the horizontal lines sampled in the step (a), the reconstructed horizontal lines being produced based on the horizontal lines of the reconstructed first block and each binary pixel referred to as a second target pixel being made by using a corresponding second context value based on a predetermined probability table, wherein the corresponding second context value for the second target pixel is calculated by using the context values of 8 binary pixels including a binary pixel located at an identical position to that of the second target pixel within the previous frame and 7 binary pixels located at an upper left, above, upper right, left, lower left, below, lower right positions, respectively, of the second target pixel within the reconstructed BAB.

2. The method according to claim 1, wherein the step (a) is the step of sampling even-numbered horizontal lines of the BAB to generate the first block, and the step (b) is the step of sampling even-numbered vertical lines of the first block to generate the first sample block.

3. The method according to claim 2, wherein the current and the previous frame are replaced by a current video object plane (VOP) and a previous VOP, respectively.

4. The method according to claim 2, wherein, in the step (c), the first corresponding context value, being referred to as V, is calculated by using context values V0 to V7 of said 8 binary pixels according to the following equation Eq. (1):

$$V = \sum_{k=0}^{7} (V_k)2^k,  \quad \text{Eq. (1)}$$

wherein $V_k$ represents a binary value, either 1 or 0, of a binary pixel having the context value of Vk and when there is no binary pixel having the context value of Vk, $V_K$ is set as 0.

5. The method according to claim 4, wherein, in the step (d), the second corresponding context value, being referred to as V', is calculated by using context values V'0 to V'7 of said 8 binary pixels according to the following equation Eq. (2):

$$V' = \sum_{k=0}^{7} (V'_k)2^k, \quad \text{Eq. (2)}$$

wherein $V'_k$ represents a binary value, either 1 or 0, of a binary pixel having the context value of V'k, and when there is no binary pixel having the context value of V'k, $V'_K$ is set to as 0.

6. The method according to claim 5 further comprising, after the step (d), the steps of:

(e) in case of an intra mode, encoding the first sample block by using a bit-map-based encoding method to thereby supply an encoded base layer; and (f) in case of an inter mode, based on corresponding BAB's within the previous frame, obtaining first sample blocks in the same manner generating the first sample block within the current frame described in the steps (a) and (b), and then storing the first sample blocks within the previous frame; comparing the first sample block within the current frame with the first sample blocks within the previous frame to detect a first sample block within the previous frame most similar to the first sample block within the current frame as a predicted first sample block; obtaining a motion vector, expressed by a two-dimensional vector having horizontal and vertical components, representing a displacement between the first sample block within the current frame and the predicted first sample block; encoding the motion vector to thereby generate an encoded motion vector; encoding error data representing the difference between the first sample block within the current frame and the predicted first sample block to thereby produce encoded error data; and combining the encoded motion vector and the encoded error data to thereby supply encoded base layer data.

7. The method according to claim 6 further comprising, after the step (f), in the inter mode, the steps of:

(g) subtracting each of the first sample blocks of (M/2)×(N/2) binary pixels within the previous frame from each of corresponding first blocks of (M/2)×N binary pixels within the previous frame to generate and store second sample blocks of (M/2)×(N/2) binary pixels within the previous frame, and subtracting said each of the corresponding first blocks within the previous frame from each of the corresponding BAB's within the previous frame to produce and store second blocks of (M/2)×N binary pixels within the previous frame;

(h) subtracting the first sample block of (M/2)×(N/2) binary pixels within the current frame from the first block of (M/2)×N binary pixels within the current frame to generate a second sample block of (M/2)×(N/2) binary pixels within the current frame;

(i) detecting, among the second sample blocks within the previous frame, a second sample block most similar to the second sample block within the current frame as a predicted second sample block based on the motion vector;

(j) creating a reconstructed first block by placing vertical lines of the predicted second sample block as odd-numbered vertical lines thereof sequentially under the condition that the vertical lines of the first sample block within the current frame are placed as even-numbered vertical lines thereof;

(k) subtracting the first block of (M/2)×N binary pixels within the current frame from the BAB of M×N binary pixels within the current frame to generate a second block of (M/2)×N binary pixels within the current frame;

(l) detecting, among the second blocks within the previous frame, a second block most similar to the second block within the current frame as a predicted second block based on the motion vector; and (m) creating a reconstructed BAB of M×N binary pixels referred to as a second reconstructed BAB by placing horizontal lines of the predicted second block as odd-numbered horizontal lines thereof sequentially under the condition that the horizontal lines of the first block within the current frame are placed as even-numbered horizontal lines thereof.

8. The method according to claim 7 further comprising, after the step (m), in the inter mode, the steps of:

(n) encoding the first and the second reconstructed BAB's to thereby generating a first and a second encoded reconstructed BAB's, respectively;

(o) calculating a first and a second numbers of data bits for the first and the second encoded reconstructed BAB's, respectively;

(p) comparing the first number of data bits to the second numbers of data bits to thereby select the first reconstructed BAB and the first encoded reconstructed BAB as a selected reconstructed BAB and a selected encoded reconstructed BAB, respectively, if the first number of data bits is equal to or less than the second number of data bits; select the second reconstructed BAB and the second encoded reconstructed BAB as a selected reconstructed BAB and a selected encoded reconstructed BAB, respectively, if the first number of data bits is greater than the second number of data bits; and (q) encoding error data block representing the difference between the BAB referred to as an original BAB within the current frame and the selected reconstructed BAB, thereby producing an encoded error data block.

9. The method according to claim 8, the method further comprising, in the inter mode, after the step (q), the step of:

(r) generating mode signals, each of the mode signals being a mode signal representing one of the four modes including (1) a first mode showing that the first reconstructed BAB is selected as the selected reconstructed BAB; there exists no error between the selected reconstructed BAB and the original BAB, thereby making encoding of the selected reconstructed BAB unnecessary; and, therefore, the selected reconstructed BAB has not been encoded; (2) a second mode representing that the first reconstructed BAB is selected as the selected reconstructed BAB; and there exists some errors between the selected reconstructed BAB and the original BAB, thereby making encoding of the selected reconstructed BAB necessary; and, accordingly, the selected reconstructed BAB has been encoded; (3) a third mode indicating that the second reconstructed BAB is selected as the selected reconstructed BAB; there exists no error between the selected reconstructed BAB and the original BAB, thereby making encoding of the selected reconstructed BAB unnecessary; and, consequently, the selected reconstructed BAB has not been encoded; (4) a fourth mode indicating that the second reconstructed BAB is selected as the selected reconstructed BAB; and there exists some errors between the selected reconstructed BAB and the original BAB thereby, making encoding of the reconstructed BAB necessary; and, hence, the selected reconstructed BAB has been encoded.

10. The method according to claim 9, the method further comprising, in the inter mode, after the step (r), the step of:

(s) encoding the mode signals to thereby generate encoded mode signals; and (t) formatting an encoded mode signal related one of the four modes, the selected encoded reconstructed BAB and the encoded error data block to thereby provide an encoded enhancement layer.

11. The method according to claim 10, wherein both M and N are 16.

* * * * *